2,769,788
METHOD OF MAKING WEIGHTED POLYMER BEADS

Paul M. Craven, Walnut Creek, and James A. Patterson, Concord, Calif., assignors to The Dow Chemical Company, Midland, Mich., a corporation of Delaware No Drawing. Application October 1, 1952, Serial No. 312,668

6 Claims. (Cl. 260—17)

This invention concerns a method for making polymer beads, having particles of a more dense solid material embedded therein, by a suspension polymerization procedure. The more dense solid particles embedded in the beads serve as a weighting material to give the beads a density greater than that of the polymer therein. The invention pertains especially to the production of weighted beads, i. e. rounded and substantially spherical granules, of copolymers of monovinyl- and polyvinyl-aromatic compounds.

A copending application, Serial No. 309,136, filed September 11, 1952, by ourselves and others discloses a method of making weighted polymer beads which involves treating a finely divided solid material, having a density greater than that of the polymer to be formed, with a hydrophobing agent to render the same organophilic, i. e. readily wetted by liquid hydrocarbons, admixing the thus-treated solid material with a liquid mixture of mono-vinyl- and polyvinyl-aromatic hydrocarbons, and stirring the resulting mixture together with a non-solvent liquid medium to form a suspension of droplets of said mixture in the medium while heating to cause polymerization of the monomers and resultant solidification and hardening of the droplets. The weighted copolymer beads thus formed are chemically treated in known manner to introduce ionizable radicals into the copolymer molecule and thus obtain weighted beads of ion exchange resins, which beads can be used with higher liquid flow rates in certain ion exchange operations than can unweighted beads of the ion exchange resins alone.

Although the method of said copending application permits production of weighted copolymer beads having dense solid particles embedded therein, it possesses certain disadvantages. During an early stage of the suspension polymerization reaction the droplets of the mixture of monomers and weighting material tend to become stuck together upon colliding with one another with resulting formation of clusters of the droplets or beads. Although the partially polymerized droplets or beads can often be broken free from one another by continued stirring, particularly at an increased rate, this is not always possible and, when accomplished, usually causes rough spots on, or non-uniformity in shape of, the beads that are formed. The weighted beads obtained by such method usually do not vary widely in mesh sizes from one another, but do include a considerable proportion of rounded granules which are not spherical, e. g. are of an oval or irregular shape. As a consequence, the weighted beads of the copolymer, and of the ion exchange materials prepared therefrom, do not pack as closely together in a bed as do truly spherical granules of the same mesh sizes. The poorer packing together of the irregular shaped ion exchange resin beads, as compared to that obtained with spherical beads of the same range of mesh sizes, results in an increase in the proportion of voids between the beads in a bed of the latter and a corresponding decrease in the ion exchange capacity per cubic foot of the bed.

It is an object of this invention to provide a method of making weighted polymer beads (having particles of a material more dense than the polymer embedded therein) by a suspension polymerization procedure, which method prevents, or reduces greatly, the above-mentioned tendency of the droplets of the mixture of polymerizable material and weighting material to become stuck together during an early stage of the polymerization and which method permits production of weighted polymer beads that, on an average, are more nearly spherical and pack together more closely than similar weighted beads made by the method of the above-mentioned copending application, Serial No. 309,136. Other objects will be evident from the following description of the invention.

We have found that by employing an aqueous solution of an ionizable inorganic salt as a medium for the suspension polymerization of one or more vinylaromatic compounds in admixture with a more dense finely divided solid material and otherwise operating in accordance with the method of the aforementioned copending application, the tendency of the partially polymerized droplets of the mixture to become stuck together during the suspension polymerization reaction is reduced or eliminated and there are obtained weighted polymer beads which, on an average, are more nearly spherical than are obtained when the inorganic salt is omitted. Because of their more nearly spherical form, the beads of the weighted polymer pack more closely together as a bed than do the beads prepared in the absence of the salt, but in otherwise similar manner. In instances in which the weighted beads are converted into ion exchange agents, the closeness with which they pack as a bed contributes to the ion exchange capacity per cubic foot of the bed and is of importance.

In practice of the invention, a finely divided, water-insoluble, solid material, having an absolute density of at least 2.5 and preferably 3 or higher and which is unreactive with the vinyl aromatic compounds to be polymerized and is incompatible with such compounds and their polymers, is treated with a hydrophobing agent to render it organophilic, i. e. readily wettable by liquid vinyl aromatic compounds such as styrene or divinylbenzene. The finely divided solid material should consist largely of particles of 80 Tyler screen mesh size or smaller and is preferably in the form of particles of from 100 to 350 mesh size or smaller. Among the finely divided solid materials which can be incorporated in the polymer beads to increase the weight of the latter are ordinary sand, powdered silica, powdered glass, metals such as iron, nickel, chromium or molybdenum in powdered form, monazite sand, zirconium oxide, and zirconium silicate. Because of its high density, its inertness to most chemicals, and its availability in large quantities, zirconium silicate is preferred.

A variety of hydrophobing agents, suitable for use in the invention, are known. Examples of such agents are long chain alkylamines such as dodecylamine, hexadecylamine, and octadecylamine, and organo-silicon compounds such as dimethyldichlorosilane, phenyltrichlorosilane, vinyltrichlorosilane, ethyltriethoxysilane, dimethylsiloxane, and methylphenylsiloxane, etc. The hydrophobing agent can be applied to the finely divided dense solid material, e. g. zirconium silicate, by immersing the solid material in a solution of the hydrophobing agent, removing it and draining excess liquid therefrom, or by contacting the dense solid material with vapors of a volatile hydrophobing agent, such as methyltrichlorosilane or dimethyldichlorosilane, and moist air. We preferably pass moist air through a body of the finely divided solid material and next pass dry air through liquid dimethyldichlorosilane and pass the resulting vapor mixture of air and dimethyldichlorosilane through the body of finely divided solid material at room temperature or thereabout. The thus-treated solid material is readily wetted by vinyl aromatic compounds such as styrene or divinylbenzene.

After being treated as just described to render it organophilic, the finely divided solid material, e. g. zirconium silicate, is mixed with one or more liquid vinyl aromatic compounds to form a mixture having an average density which is slightly less than, and usually about 85 percent of, the density of the weighted polymer beads that are to be formed. The finely divided weighting material is usually employed in amount such that its absolute volume corresponds to between 5 and 53, preferably between 15 and 30, percent of the volume of the mixture of the same and the liquid monomeric material, but it can be used in smaller or larger proportions.

Any liquid vinyl aromatic compound having the vinyl radical attached to a carbon atom of the aromatic nucleus, or any mixture of such vinyl aromatic compounds, can be used as the monomeric material to be polymerized in making the weighted polymer beads. Examples of such compounds are styrene, ar-vinyltoluene, ar-vinylxylene, ar-ethylvinylbenzene, ar-chlorostyrene, and divinylbenzene, etc. Mixtures of a major proportion of one or more monovinyl aromatic hydrocarbons and a minor amount of divinylbenzene are advantageously employed, since the weighted copolymer beads prepared therefrom can be converted by known chemical treatments into weighted beads of cation- or anion-exchange resins. Liquid mixtures of a major amount by weight of styrene and minor amounts of ar-ethylvinylbenzene and divinylbenzene, with the latter in a proportion corresponding to from 2 to 20, preferably from 5 to 15, percent of the combined weight of the vinyl aromatic compounds, are usually employed.

A minor amount of a polymerization catalyst, e. g. an organic peroxide such as dibenzoyl peroxide or dilauroyl peroxide in amount corresponding to from 0.1 to 1 percent of the weight of the polymerizable monomeric material, is usually added to increase the rate of the polymerization reaction, but is not required.

The mixture of liquid monomeric material, finely divided solid weighting material, and catalyst if employed, is admixed with sufficient of an aqueous solution of an ionizable inorganic salt to serve as a medium for the suspension polymerization reaction. Usually, three or more parts by volume of the aqueous salt solution is used per part of the mixture of liquid monomeric material and finely divided weighting material, but the salt solution can be used in somewhat smaller proportions or in as large a proportion as desired. The salt which is dissolved in the aqueous polymerization medium has an effect of reducing the tendency of the droplets undergoing polymerization to become stuck together upon striking one another in an early stage of the reaction and often completely prevents the sticking together of the droplets. It stabilizes the droplets so that, even when liquid, they have less tendency to coalesce with one another than when the aqueous medium contains no salt. It also causes formation of weighted polymer beads which, for the most part, are more nearly spherical than those obtained under similar conditions except that the salt is omitted. These desirable results are obtained to an appreciable extent regardless of the viscosity of the aqueous salt solution and even when the salt is in quite low concentration, e. g. in a concentration corresponding to only 0.5 percent of the combined weight of the same and the water. However, the effectiveness of the salt becomes greater with increase in the concentration of the same. The aqueous polymerization medium usually contains a dissolved ionizable salt in a concentration corresponding to at least 5, and preferably 10 or more, percent of the combined weight of the salt and water. It may be saturated with the salt. Any water-soluble, highly ionizable inorganic salt can be used in the aqueous polymerization medium, but those that dissolve in water to form substantially neutral solutions, i. e. salts of strong acids and strong bases, are preferred. Examples of suitable salts are sodium chloride, sodium bromide, sodium nitrate, sodium sulfate, potassium chloride, potassium sulfate, ammonium chloride, ammonium sulfate, and calcium chloride, etc.

Although the salt which is dissolved in the aqueous polymerization medium is effective for the above-mentioned purpose, regardless of the viscosity of the medium, the stirring or other agitation involved in carrying out the suspension polymerization reaction tends to cause separation of part of the finely divided weighting material from the liquid monomers at the start of the polymerization reaction unless the aqueous medium is considerably more viscous than water. This tendency toward separation of weighting material from the liquid monomers may be reduced or avoided by dissolving a thickening agent in the medium to increase the viscosity of the latter. A considerable number of thickening agents effective for such purpose are known. The thickening agent, if employed, should be non-reactive with the monomeric vinyl aromatic compounds and should be stable, i. e. should not congeal from the solution at the polymerization temperature and at the concentration of salt used. Examples of water-soluble thickening agents that can be employed are water-soluble methyl cellulose, polyethylene glycols, and the alkali, e. g. ammonium, sodium, or potassium, salts of carboxymethylcellulose. Sodium carboxymethylcellulose is particularly effective for the purpose, and is preferred. A thickening agent is preferably added in amount such as to bring the aqueous salt solution to a viscosity of from 5 to 100 centipoises at 80° C. (a usual polymerization temperature), but it can be used in smaller or larger proportions, or be omitted. The dissolving of from 0.5 to 1.5 weight percent of sodium carboxymethylcellulose in the aqueous salt solution is usually sufficient to give the solution a viscosity within the above-stated limits. The thickening agent is usually dissolved in the water prior to adding the salt, but it may be dissolved together with, or added to an aqueous solution of, the salt.

Except for the combination of starting materials employed, the suspension polymerization reaction may be carried out in a conventional manner. The mixture is heated at a polymerization temperature, usually of from 65° to 95° C., and preferably from 80° to 90° C., while stirring or otherwise agitating the same to maintain the mixture of liquid polymerizable material and finely divided solid weighting material suspended as droplets in the aqueous medium. The droplets are thereby caused to thicken and ultimately to harden. The stirring or other agitation can be discontinued prior to completion of the polymerization reaction and in some instances prior to solidification of the vinyl aromatic compounds undergoing polymerization. As hereinbefore mentioned, the presence of the salt in the aqueous polymerization medium reduces greatly the tendency of the droplets to coalesce, or become stuck together. The time required for the polymerization varies, depending on the kind of monomeric material employed, the polymerization temperature, and whether a catalyst is used. At polymerization temperatures of from 65° C. to 95° C., the catalyzed suspension polymerization is usually accomplished in from 10 to 30 hours. After being polymerized to a solid state, the weighted polymer beads are separated, e. g. by filtration or decanting, from the liquid polymerization medium.

The weighted beads from a given polymerization reaction are all of close to the same density and a major part by weight of the beads are nearly spherical and fall within a 60 mesh range of sizes according to the Tyler screen scale. The average size and density of the beads can be varied, from one batch to another, by changes in the kind or proportion of weighting material used, or the rate of stirring at the start of the polymerization reaction. In general, an increase in the proportion of a weighting material relative to the polymerizable starting material, or in the rate of stirring the polymerization mixture, causes a decrease in average size of the weighted polymer beads that are formed. The weighted beads have absolute densities greater than those of the polymer ingredients alone, e. g. the invention permits production of weighted beads having densities of from 1.1 to 2.5 or higher. The beads are usually of from 10 to 100 mesh size.

The following examples describe ways for practice of the invention, but are not to be construed as limiting its scope.

*Example 1*

Air was passed at a rate of 0.25 cubic foot per minute first through a body of water at room temperature and then through a rotating tumbler which contained 50 pounds of zircon sand (i. e. zirconium silicate of about 85 weight percent purity) nearly all of which sand was in the form of particles of 300 Tyler screen mesh size or smaller. The tumbler was of a usual construction i. e. it was a vessel mounted on a horizontal axle so that it could be rotated, and was provided with an inlet and outlet for vapors and with internal baffles to cause tumbling of material inside the same. The feed of moist air to the tumbler was continued for 1 hour, during which time 400 ml. of water had been evaporated and passed into the tumbler. Dry air was then passed at a rate of 0.25 cubic foot per minute first into a body of liquid dimethyldichlorosilane at room temperature and then into the rotating tumbler. The feed of the vapor mixture of air and dimethyldichlorosilane to the tumbler was continued for 1 hour. In this time, about 100 grams of dimethyldichlorosilane was vaporized and fed to the tumbler. During these operations the material in the tumbler was at room temperature or thereabout. This treatment did not cause appreciable change in the appearance of the zircon sand, but did render it organophilic so that it could readily be wetted with styrene, or other liquid vinyl aromatic compounds. The treatment apparently caused formation of thin films of dimethylsiloxane on the surfaces of the grains of zircon sand.

*Example 2*

A 100 gram portion of zircon sand that had been rendered organophilic by the treatment described in Example 1 was stirred together with 83 grams of a liquid mixture of 78.5 percent by weight styrene, 9.5 percent ar-ethylvinylbenzene and 12 percent divinylbenzene. The resulting mixture was divided into two equal portions. One portion of the mixture was vigorously shaken together with about 215 cc. of a 1.3 percent by weight solution of sodium carboxymethylcellulose in water, whereby the mixture of zircon sand and the liquid vinyl aromatic hydrocarbons was broken up as small visible droplets suspended in the aqueous sodium carboxymethylcellulose solution. When the agitation was discontinued, the droplets rapidly coalesced with one another and separated as a continuous layer from the aqueous medium. Sodium chloride was dissolved in a 1.3 percent aqueous solution of sodium carboxymethylcellulose to form a solution containing about 16.5 percent by weight of sodium chloride. The other half of the aforementioned mixture of zircon sand and the vinyl aromatic hydrocarbons was agitated together with 215 cc. of the resulting aqueous solution of sodium carboxymethylcellulose and sodium chloride so as to form a suspension of small visible droplets of said mixture in the aqueous medium. When the suspension of the droplets in the aqueous medium had been formed, agitation was discontinued and the mixture was permitted to stand at room temperature for four hours. At the end of this time the mixture remained as a suspension of the droplets in the aqueous medium i. e. the droplets of the mixture of zircon sand and the monomeric vinyl aromatic compounds did not coalesce to an observable extent during the four hours of standing.

*Example 3*

In each of two experiments, 302 grams of zircon sand that had been treated as described in Example 1 was stirred together with 200 ml. of a liquid mixture of 78.5 percent by weight styrene, 9.5 percent ar-ethylvinylbenzene and 12 percent divinylbenzene. Dibenzoyl peroxide was added in amount corresponding to 0.75 percent of the combined weight of the vinyl aromatic compounds. In one of the experiments, the mixture thus formed was polymerized while suspended as droplets in an aqueous solution of sodium carboxymethylcellulose in a 1.3 weight percent concentration. In the other experiment, the mixture of zircon sand, the vinyl aromatic compounds and the dibenzoyl peroxide catalyst was subjected to polymerization while suspended as droplets in an aqueous solution of 1.15 percent by weight of sodium carboxymethylcellulose to which sodium chloride had been added in amount corresponding to 20 percent of the weight of the water present, i. e. the resulting aqueous solution contained approximately 16.5 weight percent of sodium chloride and 0.96 percent of sodium carboxymethylcellulose. Each polymerization was accomplished by stirring the mixture to form a suspension of droplets of the mixture of zircon sand, the vinyl aromatic compounds and catalyst in the aqueous medium while heating the entire mixture at temperatures of from 80° to 90° C. After becoming solidified and hardened, the resulting weighted copolymer beads were separated by filtration from the aqueous medium, and washed with water. Each of the batches of weighted beads thus obtained was sulfonated in known manner by reaction with chlorosulfonic acid. The sulfonation conditions were the same for both batches. Each batch of the weighted sulfonated beads was washed with water and then examined for physical form and to determine the compactness of a bed of the same. It was found that the sulfonated beads obtained in the experiment which involved use of the aqueous sodium carboxymethylcellulose solution that did not contain sodium chloride were of non-spherical, i. e. ovoidal, shape and that a bed of the same comprised approximately 53 perecent by volume of the sulfonated copolymer beads and 47 percent of voids between the beads. This bed of beads was tested in the usual manner for ion exchange capacity and was found to neutralize 0.0014 gram molecular weight of sodium hydroxide per cubic centimeter of the bed. The batch of weighted sulfonated copolymer beads obtained in the experiment involving use of the aqueous solution of sodium carboxymethylcellulose and sodium chloride as the polymerization medium was similarly examined and tested for ion exchange capacity. These beads were substantially spherical and formed a bed comprising approximately 61 percent by volume of solid beads and 39 percent of voids between the beads. One cubic centimeter of the bed of beads neutralized 0.0018 gram molecular weight of sodium hydroxide. Accordingly, the use of an aqueous solution of an ionizable salt as the polymerization medium, rather than an aqueous medium substantially free of such salt, resulted in an approximately 28.5 percent increase in ion exchange capacity of the weighted sulfonated copolymer per cubic centimeter of a bed of the beads.

*Example 4*

Approximately 80.7 pounds of zircon sand, which had been treated as described in Example 1, was stirred together with 60.6 pounds of a liquid mixture of 78.5 percent by weight styrene, 9.5 percent ar-ethylvinylbenzene and 12 percent divinylbenzene. Approximately 0.339 pound of dibenzoyl peroxide was added with stirring. The resulting mixture was added to 52 gallons of an aqueous solution of sodium carboxymethylcellulose in an approximately 0.96 weight percent concentration and sodium chloride in a 16.5 percent concentration while stirring to form a suspension of the added mixture as visible droplets in the aqueous salt solution and heating the entire mixture at 80° C. After completing the addition, the mixture was stirred and heated at 80° C. for about 1½ hours. The temperature was then gradually raised to 90° C. while continuing the stirring. The suspended droplets were thereby caused to solidify and harden. The resulting weighted copolymer beads were separated by filtration, washed with water and thereafter sulfonated in known manner by reaction with chlorosulfonic acid. The sulfonated product was in the form of substantially spherical weighted beads having a density considerably greater than that of the sulfonated copolymer alone. The beads were of from 10 to 100 mesh size with about 80 percent by weight or more of the beads being of from 10 to 40 Tyler mesh size. The product was suitable for use as a cation exchange agent.

*Example 5*

A mixture of zircon sand that had been treated as described in Example 1, styrene, ar-ethylvinylbenzene, divinylbenzene, dibenzoyl peroxide and an aqueous salt solution in the relative proportions given in Example 3, was stirred to cause formation of a suspension of droplets of the mixture of zircon sand, the monovinyl aromatic compounds, and the dibenzoyl peroxide catalyst in the aqueous salt solution while heating at temperatures of from 80° to 90° C. to cause solidification and hardening of the droplets. The salt solution which was employed as the polymerization medium was an aqueous solution of approximately 1.2 percent by weight of sodium carboxymethylcellulose and 9 percent of sodium chloride. The droplets did not coalesce or become stuck together during the polymerization and substantially spherical weighted copolymer beads were obtained.

We claim:

1. A method which comprises treating a finely divided solid material, which has an absolute density of at least 2.5 and is of not larger than 80 mesh particle size and which is insoluble in and chemically inert to vinyl aromatic compounds and their polymers, with an agent which, when applied to water-wettable solid material, renders the latter repellent to water and wettable by organic liquids, admixing the thus-treated solid material with at least one liquid vinyl aromatic hydrocarbon to form a slurry of the solid particles and the liquid vinyl aromatic hydrocarbon, agitating the slurry together with a larger volume of an aqueous salt solution that is non-solvent for said slurry and has at least 0.5 percent by weight of a strongly ionized inorganic salt dissolved therein, to form a suspension of droplets of said slurry in the aqueous salt solution while heating the agitated mixture to cause polymerization of the vinyl aromatic hydrocarbon, whereby there are formed substantially spherical solid beads of the polymerized vinyl aromatic hydrocarbon having the finely divided solid starting material embedded therein.

2. A method, as claimed in claim 1, wherein the aqueous salt solution is substantially neutral, contains at least 5 weight percent of a dissolved ionizable inorganic salt, and has a viscosity of from 5 to 100 centipoises at 80° C.

3. A method, as claimed in claim 1, wherein the vinyl aromatic hydrocarbon starting material is a liquid mixture of from 85 to 98 percent by weight of at least one monovinyl aromatic hydrocarbon and from 2 to 15 percent of divinylbenzene.

4. A method, as claimed in claim 1, wherein the aqueous salt solution contains sufficient of a thickening agent so that it has a viscosity of from 5 to 100 centipoises at 80° C.

5. A method, as claimed in claim 1, wherein the aqueous salt solution is an aqueous solution of at least 5 percent by weight of sodium chloride and sufficient sodium carboxymethylcellulose to give it a viscosity of from 5 to 100 centipoises at 80° C.

6. A method, as claimed in claim 5, wherein the vinyl aromatic hydrocarbon starting material is a liquid mixture of styrene, ar-ethylvinylbenzene, and from 2 to 15 percent by weight of divinylbenzene and the finely divided solid starting material is zirconium silicate.

References Cited in the file of this patent

UNITED STATES PATENTS

| | | |
|---|---|---|
| 2,366,007 | D'Alelio | Dec. 26, 1944 |
| 2,433,992 | Hughes | Jan. 6, 1948 |
| 2,566,567 | Hutchinson | Sept. 4, 1951 |
| 2,591,574 | McBurney | Apr. 1, 1952 |
| 2,687,408 | Grim | Aug. 24, 1954 |